April 26, 1960 C. VAN DER LELY ET AL 2,933,878
CONVERTIBLE SIDE DELIVERY RAKE
Filed Nov. 28, 1955 8 Sheets-Sheet 1

INVENTORS
Cornelis van der Lely and
Ary van der Lely.
BY Mason, Mason and Albright
ATTORNEYS.

April 26, 1960

C. VAN DER LELY ET AL 2,933,878

CONVERTIBLE SIDE DELIVERY RAKE

Filed Nov. 28, 1955

8 Sheets-Sheet 3

INVENTORS
Cornelis van der Lely and
Ary van der Lely.

BY Mason, Mason and Albright

ATTORNEY

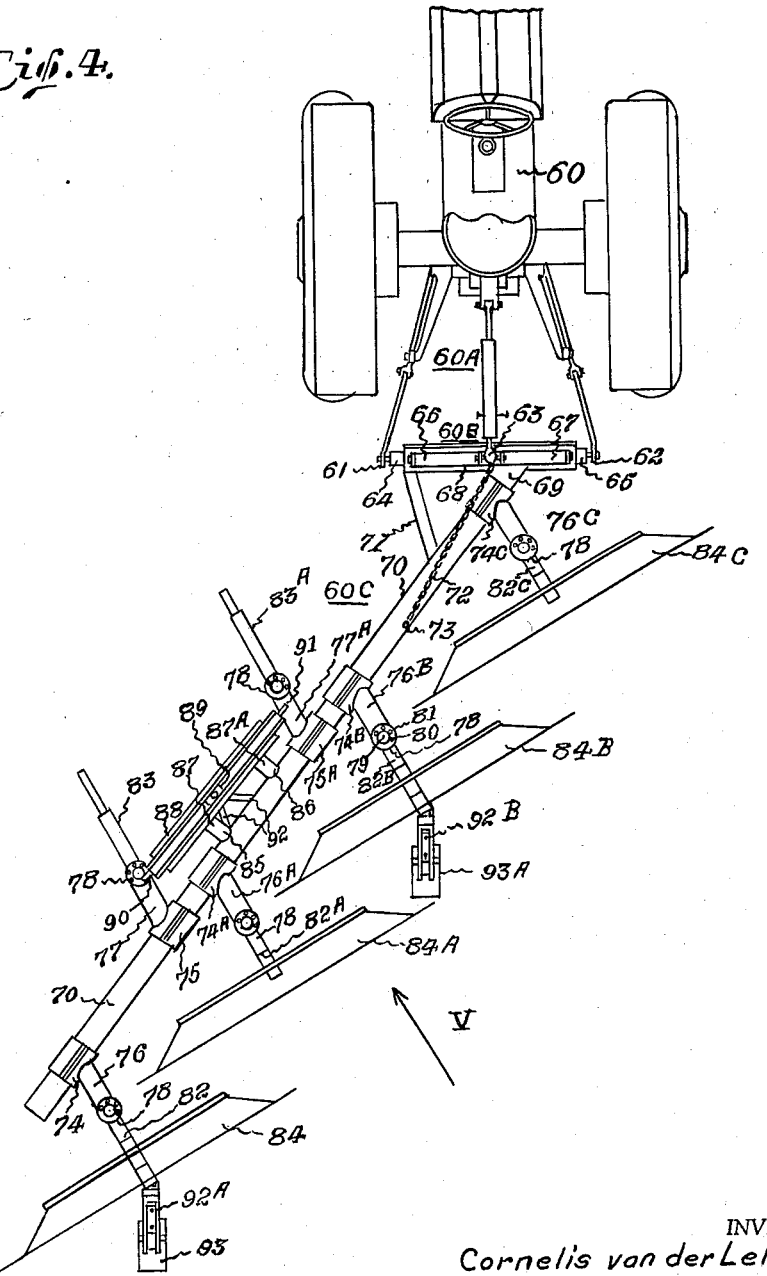

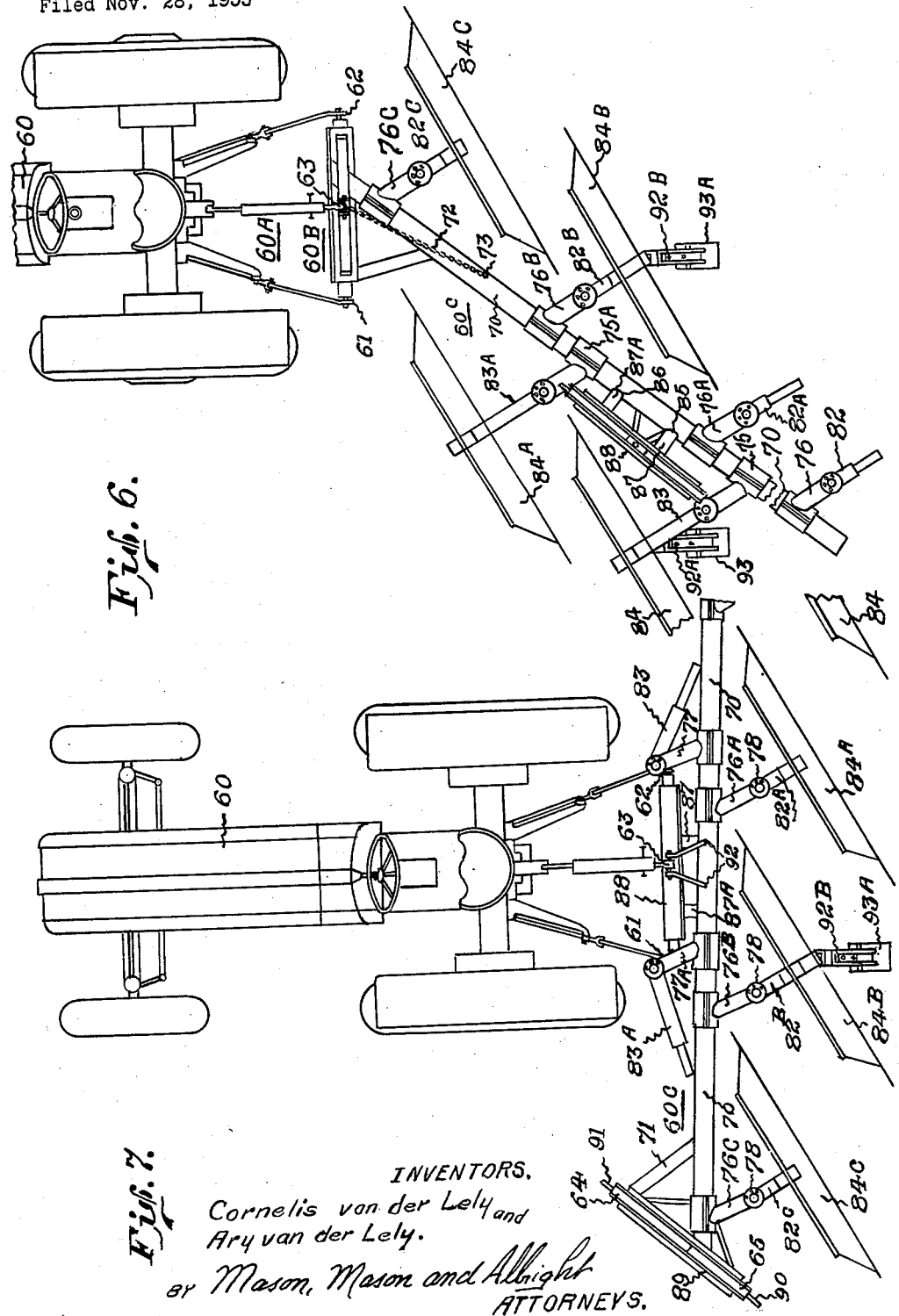

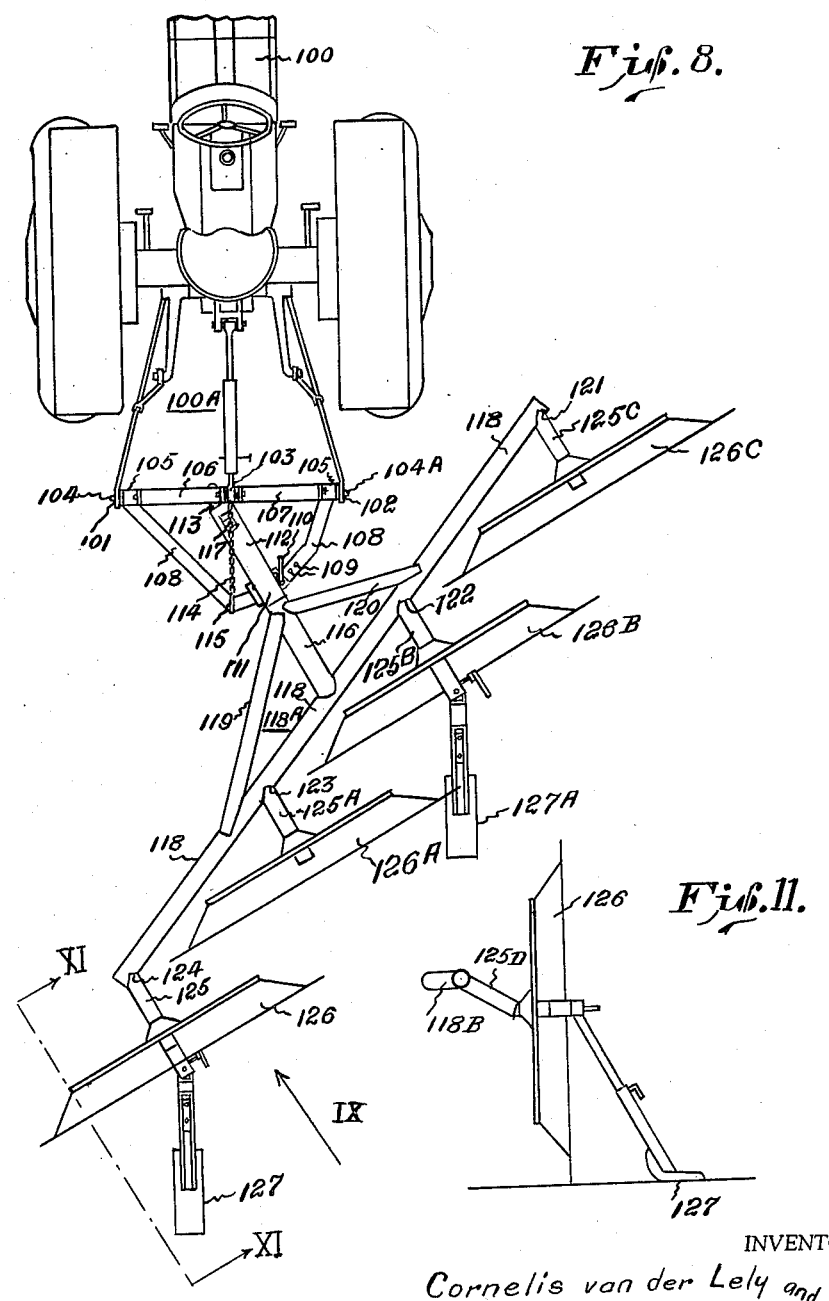

INVENTORS
Cornelis van der Lely and
Ary van der Lely.

BY Mason, Mason and Albright
ATTORNEYS

April 26, 1960   C. VAN DER LELY ET AL   2,933,878
CONVERTIBLE SIDE DELIVERY RAKE
Filed Nov. 28, 1955   8 Sheets-Sheet 8

INVENTORS.
Cornelis van der Lely and
Ary van der Lely.

BY Mason, Mason and Albright
ATTORNEYS.

United States Patent Office 2,933,878
Patented Apr. 26, 1960

2,933,878

CONVERTIBLE SIDE DELIVERY RAKE

Cornelis van der Lely and Ary van der Lely, Maasland, Netherlands, assignors to C. van der Lely N.V., Maasland, Netherlands, a Dutch limited-liability company Application November 28, 1955, Serial No. 549,482

Claims priority, application Netherlands November 27, 1954

7 Claims. (Cl. 56—377)

The invention relates to an implement for laterally displacing material lying on the ground provided with a frame or support on which is mounted at least one raking member being obliquely arranged with regard to the direction of travel, and being set in motion with regard to the support by its coming into contact with the ground. Implements of this kind are well known. When used after a tractor these known implements can be fastened to the fixed pulling hook of the tractor.

It is an object of the invention to use for the implement in a favourable manner the lifting device with which the tractor generally is provided. According to the invention the implement is provided with a fastening device arranged for fastening the implement to the lifting device of a tractor, the support being swingable about a horizontal axis with regard to two arms of the lifting device.

Figure 1:
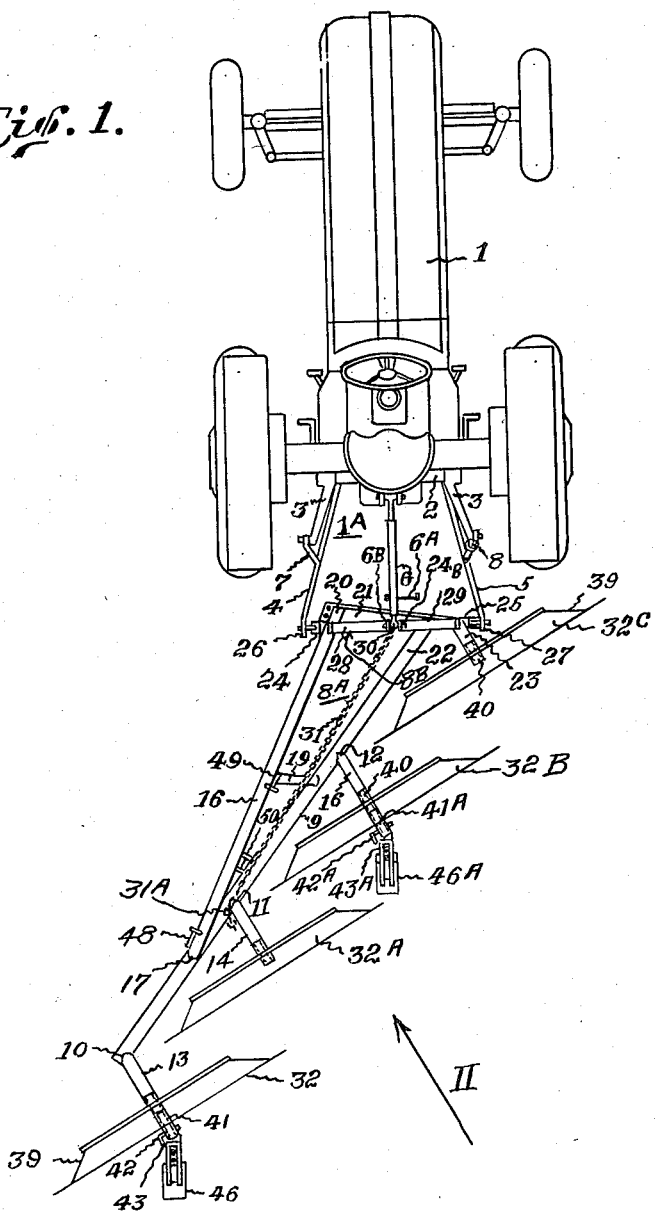
Figure 2:
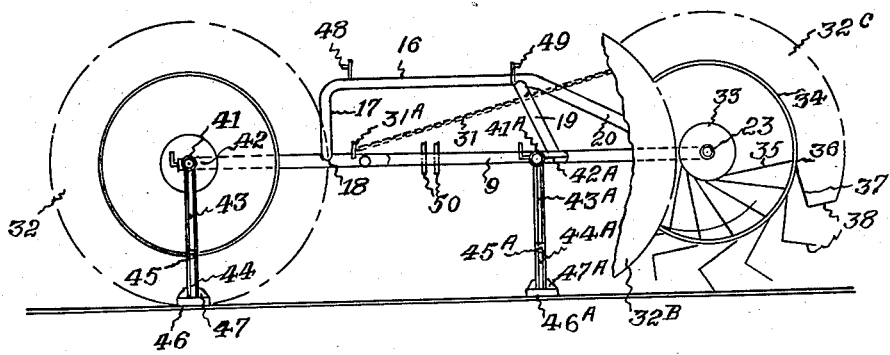

Further embodiments and details will be hereinafter more fully described with reference to the accompanying drawings in which some preferred embodiments of the device according to the invention have been illustrated by way of example in which:

Fig. 1 shows a plan elevation of an implement attached to the lifting device of a tractor, said implement according to the invention being in a working position in which it constitutes a side delivery rake, Fig. 2 shows a side elevation of the same implement viewed in the direction of the arrow II in Fig. 1, the raking members not all of them being shown for the sake of clearness.

Figure 5:
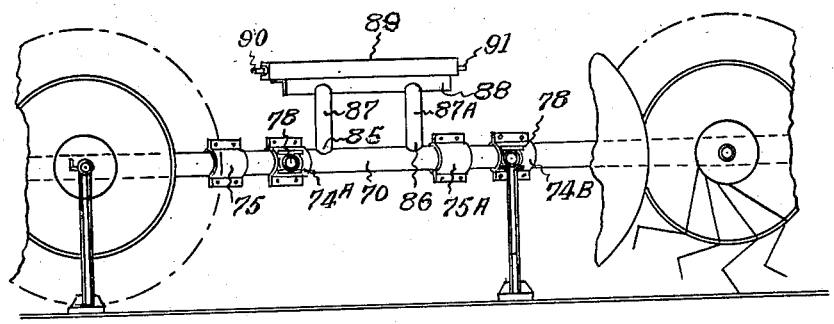
Figure 3:
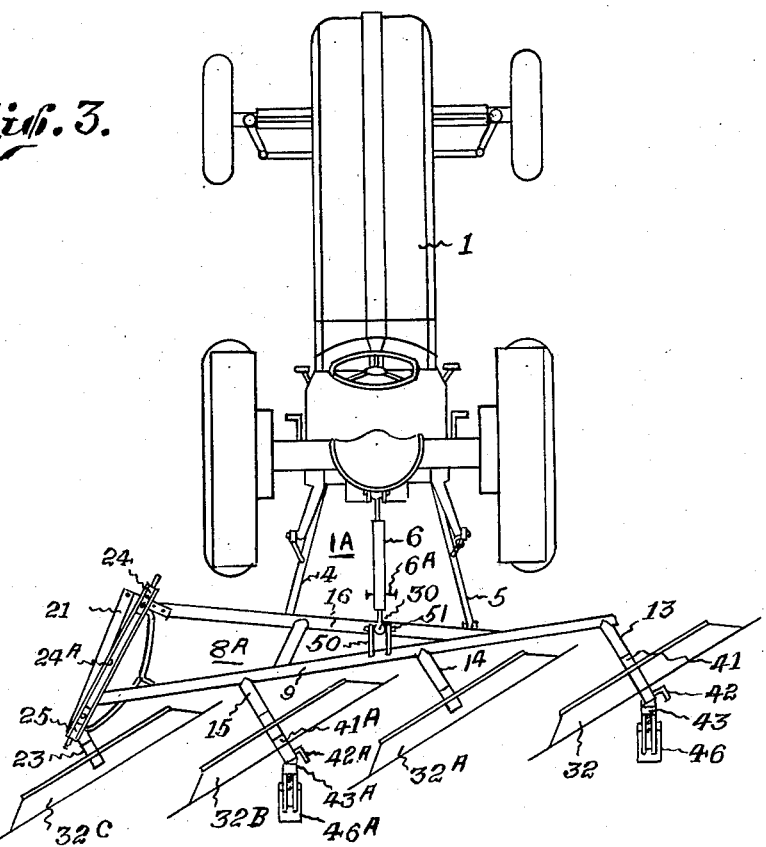
Figure 12:
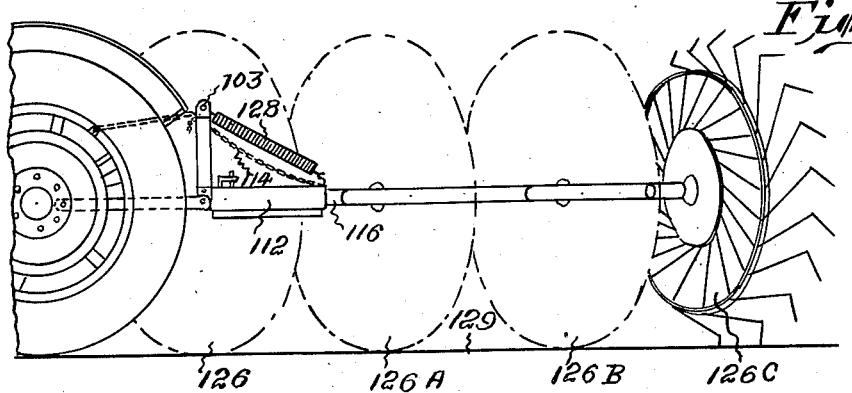
Figure 9:
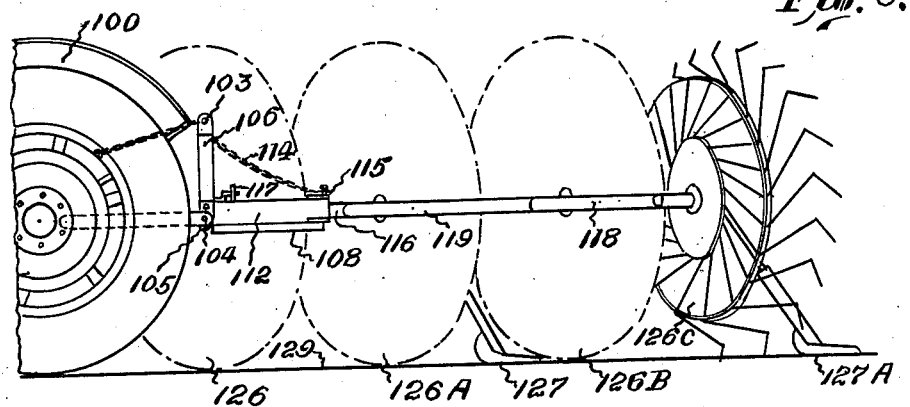
Figure 10:
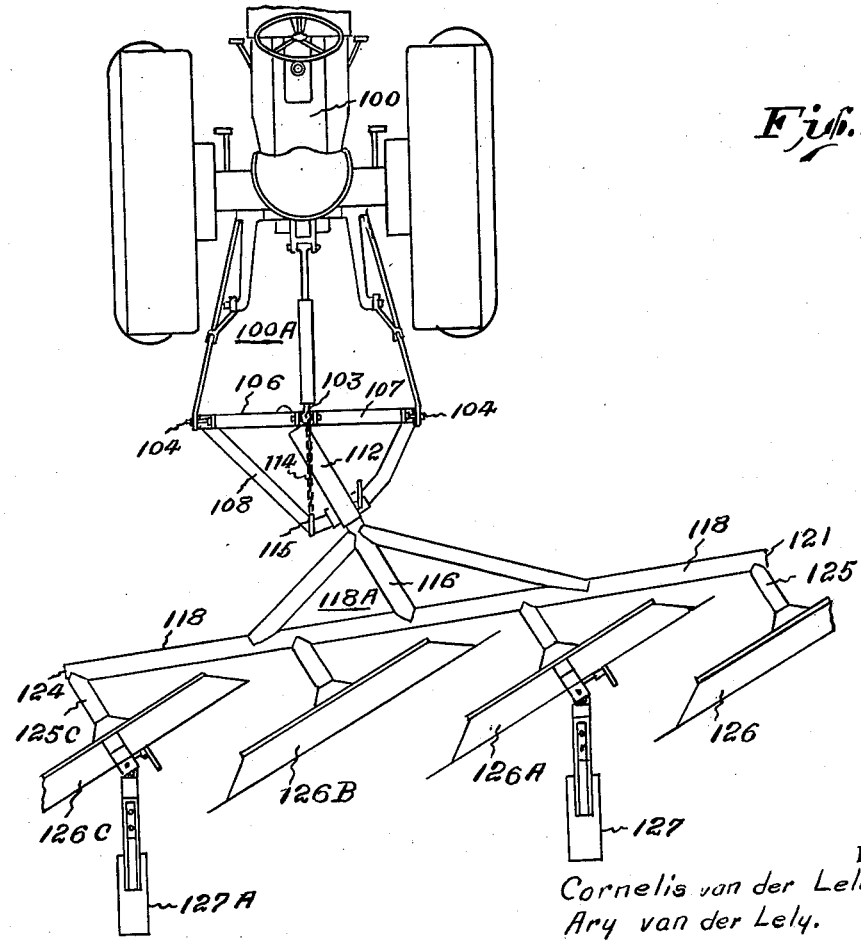
Figure 14:
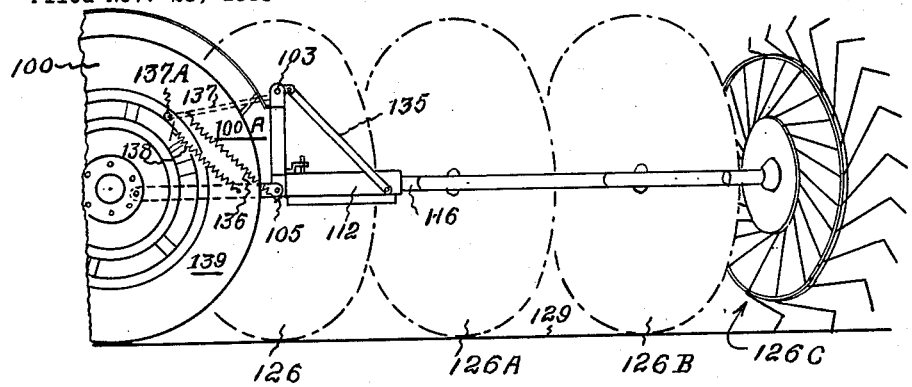
Figure 15:
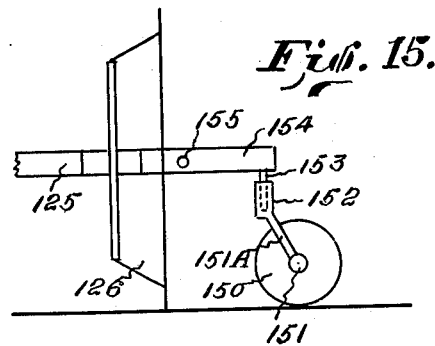
Figure 13:
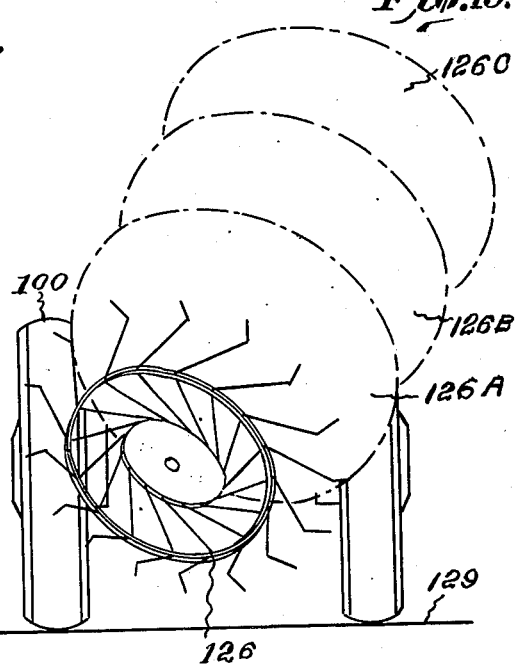
Figure 16:
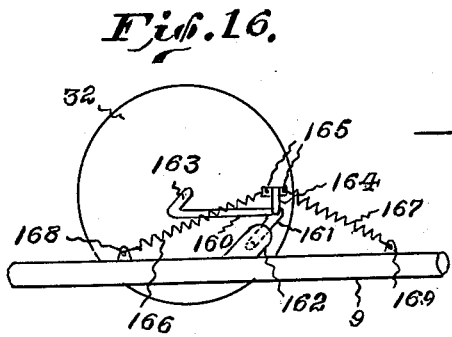

Fig. 3 shows a plan view of the same implement in a different working position, the frame being attached upside down to a lifting device of a tractor and the implement constituting a teddering device, Fig. 4 shows a plan elevation of a second embodiment of the implement according to the invention, the implement being attached to the lifting device of a tractor, Fig. 5 shows a side elevation of said second embodiment viewed in the direction of the arrow V in Fig. 4, the raking members not all of them being shown for the sake of clearness, Fig. 6 shows a plan elevation of a working position of the implement according to Figs. 4 and 5 in which the implement constitutes a swath turner, Fig. 7 shows a plan elevation of a third working position of the implement according to Figs. 4–6 in which the implement constitutes a teddering device and in which the frame is attached upside down to the lifting device, Fig. 8 shows a plan elevation of a third embodiment of the implement according to the invention in a working position in which the implement constitutes a side delivery rake, in which embodiment the implement is attached to the lifting device of a tractor, Fig. 9 is a side elevation of the implement according to Fig. 8 viewed in the direction of the arrow IX, Fig. 10 shows a plan elevation of the implement according to Fig. 8 in a second working position in which the implement constitutes a teddering device and in which the frame is turned upside down, Fig. 11 shows a side elevation, viewed in the direction XI in Fig. 8, of a part of an implement substantially according to Fig. 8, but in which the position of the frame with regard to the axles of the rake wheels is modified relative to the position of said parts shown in Fig. 9, Fig. 12 is a side elevation of an implement substantially according to Fig. 8, but in which the supporting members resting on the ground are lacking and instead of them a resilient device being applied between the frame and the fastening device of the frame to the tractor, Fig. 13 shows an implement according to Fig. 12 in a position behind the tractor, said position being advantageous for transporting the implement, Fig. 14 is a side elevation of an implement substantially according to Fig. 12, but in which the resilient device is removed to the lifting device of the tractor, Fig. 15 shows a side elevation, viewed in the direction of the arrow XI in Fig. 8, of a part of an implement substantially according to Fig. 8, but in which a supporting member is provided with a running wheel instead of a shoe, Fig. 16 shows another embodiment of the fastening of a rake wheel to the frame of an implement according to Fig. 3.

According to Fig. 1 the rear axle housing 2 of a tractor 1 is provided with a lifting device 1A consisting of two arms 3 which can be moved upwards and downwards by means of engine power, as well as of three bars 4, 5 and 6 hingedly connected to the rear axle housing 2, the bars 4 and 5 being located about in the same plane and being suspended by the free extremities of the arms 3 by means of tie rods 7 and 8. The bar or elongated device 6 the length of which is adjustable by a telescopic connection with the bar 6B, is located between the bars 4 and 5, but higher. The length of bar 6 is fixed by pin 6A. The implement fixed to the tractor 1 comprises a frame 8A substantially consisting of a horizontal tube 9 in which mutually parallel, horizontal axles 13, 14 and 15 are mounted thereon at 10, 11 and 12, and of a tube 16 (see also Fig. 2), an extremity 17 of which is bent straight downwards and attached to the tube 9 at 18. The tubes 9 and 16 are interconnected by means of a short tube 19 at a distance from the place 18, whilst the end 20 of the tube 16, said end 20 being turned away from the end 17 of the tube 16, is connected to the adjacent end 22 of the tube 9 by means of a horizontal bar 21. The bar 21 carries an axle 23 which is parallel to the axles 13, 14 and 15 and is coplanar with them. An axle 24A (see Fig. 3) the extremities of which are designated by 24 and 25 is adjustably connected in such a way to the bar 21 that the angle which the tube or oblong portion 9 of the frame makes within a horizontal plane with the length of the tractor 1, can be modified within certain limits. The connecting members or extremities 24 and 25 are connected hingedly with the free ends or connecting members 26 and 27 of the bars 4 and 5, whilst two supporting bars 28, 29 located in the same vertical plane and extending obliquely upwards from the ends 24 and 25, are hingedly connected at their upper ends by hinge axis 24B to the end 30 of the bar 6 and at their lower ends to the frame 8A. The bars 28 and 29 constitute a fastening device 8B for fastening the frame 8A to the lifting device 1A. A chain 31 extends from the upper end 30 of the bar 28 to a hook 31A attached near the place 18 to the tube 9.

Four rake wheels 32, 32A, 32B and 32C are rotatably mounted upon the axles 13, 14, 15 and 23. Each of the rake wheels 32, 32A–32C is composed of a hub 33, a rim 34 and steel wires 35, an end of which being fixed to the hub 33 and being put through apertures in the rim 34 as shown in the rake wheel 32C in Fig. 2. Inside the rim 34 the steel wires 35 are located in the plane of the rim 34 and make an angle with the radial direction. Outside the rim every steel wire 35 is bent at 36 and proceeds as a member 37 for a tooth 38 constituted by the extremity of the steel wire 35, said tooth 38 being about parallel to the part of the steel wire 35 which is located inside the rim 34. The member 37 lies in a plane which is designated in Fig. 1 by 39 and which has about the shape of a part of a cone which widens in backward direction. The hubs 33 of the rake wheels are journaled on the axles 13, 14, 15 and 23 by means of bushings 40. The axles 13 and 15 extend through the bushings in question and each of them carries a bushing 41, 41A, respectively. Through the bushings 41, 41A and the axle 13, 15, respectively, located in said bushings 41, 41A, a hole is bored perpendicularly to the center line and intersecting said line, locking pins 42, 42A, respectively being placed in said hole. The bushings 41, 41A carry at their bottom an arm 43, 43A, respectively having a sliding portion 44, 44A which can be secured in a definite position by means of a locking bolt 45, 45A and which portion 44, 44A carries at its bottom a shoe 46, 46A having a front end 47, 47A so that the shoes 46, 46A can easily slide along the ground in a forward direction.

The tube 16 of the frame 8A carries two pins 48 and 49 being in alignment which can be fixed to the ends 26 and 27, the supporting bars 28, 29 and the ends 24 and 25 are released from the ends 30, 26 and 27, the tube 9 carrying a fork 50 which in that case can be coupled to the end 30 which is because of the fact that the fork 50 is situated lower than the pins 48 and 49, only possible if first of all the frame 8A is turned upside down. The position in which said frame is attached to the bars 4, 5 and 6 of the three-point lifting device 1A of the tractor 1, is shown in Fig. 3. In said working position of the implement the bushings 41, 41A with the arms 43, 43A and the shoes 46, 46A are arranged in a position turned 180° about the axle 13, 15, respectively, with regard to the position which they occupy according to Figs. 1 and 2 relative to the frame 8A. The alteration of position is obtained by taking away the pins 42, 42A, by turning the bushings 41, 41A with respect to said frame 180° about their axle and by applying the pins 42, 42A again.

In the working position according to Figs. 1 and 2 of the implement it works as a side delivery rake when the tractor travels forward, the frame 8A of said side delivery rake being supported by the ends 24 and 25 and by the shoes 46, 46A which forms part of supporting members comprising also the arms 43, 43A, 44, 44A and the bushings 41, 41A, whereby the frame 8A is hingeable about the line 24—25. In said working position no force is exerted over the extremity 30 of the bar 6, because the chain 31 is slack in normal operation. The chain 31 can be easily shortened or lengthened by connecting other chain links to the hook 31A. When the implement is lifted by means of the lifting device 1A, the chain 31 will soon be strained and will limit the angle between the frame 8A and the fastening device 8B comprising amongst other things the supporting bars 28 and 29, after which the rake wheels 32, 32A, 32B and 32C and the shoes 46, 46A, 46B and 46C will leave the ground upon further lifting. The implement working in the working position as a side delivery rake, the material on the ground being delivered to the left by means of the rake wheels 32, 32A, 32B and 32C during forward movement, can be transported in that case. In the working position of the implement shown in Fig. 3 it works as a teddering device, each of the rake wheels 32, 32A, 32B and 32C working the material on a small strip of ground. The worked strips are close to and adjacent one another due to a correctly chosen distance between the axles 13, 14, 15 and 23 of the rake wheels 32, 32A, 32B and 32C. The bars 4, 5 and 6 are independently hingeable during operation, owing to which the implement can continually adapt itself to the ground.

In the embodiment according to Fig. 4 the three ends 61, 62 and 63 of a three-point lifting device 60A of a tractor 60 carry a fastening device 60B for the frame 60C of the implement, which device consists of an axle having ends 64 and 65, the frame 60C being able to rotate about said axle with regard to the fastening device 60B, and of supporting bars 66 and 67 extending obliquely upwards and being at their top hingedly connected to the end 63 and at their lowermost portion hingedly connected to a bar 68.

The bar 68 is connected to an end 69 of a tubular frame beam 70. A chain 72 connects the end 63 of a bar to a hook 73 on the beam 70. Six divided bushings 74, 74A, 74B and 74C and 75 and 75A are clamped on said beam 70 (see also Fig. 5). The four bushings 74, 74A, 74B and 74C are equally spaced apart. The distances can be changed, however, according to the wishes by releasing and attaching again the bushings 74, 74A, 74B and 74C. Also the place of the bushings 75 and 75A can be modified. The bushings 74, 74A, 74B, 74C and 75 and 75A, respectively, carry short arms 76, 76A, 76B and 76C and 77, 77A, respectively the arms 76, 76A, 76B, 76C being directed backwards and the arms 77 and 77A forward. All arms are horizontal and parallel and carry a hinged connection 78 having a vertical hinge axle 79 which connections can be secured in a plurality of positions by means of a pin 80 in any of a number of holes 81 applied in the parts being interconnected as shown in Fig. 4A. The hinged connections 78 mounted on the arms 76, 76A, 76B and 76C and 77, 77A, respectively, connect said arms to horizontal axles 82, 82A, 82B and 82C and 83, 83A, respectively. In the working position according to Figs. 4 and 5 of the implement rake wheels 84, 84A, 84B, 84C of the same kind as described in Figs. 1–3 are rotatably mounted on the axles 82, 82A, 82B, 82C. In the working position according to Fig. 6 in which the frame 60C is attached to the tractor 60 in the same way as in Figs. 4 and 5 rake wheels 84, 84A, 84B, 84C are applied, however, the rake wheels 84B and 84C on the axles 82B and 82C and the rake wheels 84 and 84A on the axles 83 and 83A. Moreover, two short tubes 87, 87A extending obliquely upwards and carrying a bar 88 are fixed to the beam 70 at 85 and 86.

A beam 89 carrying at its ends pins 90 and 91 is mounted on said bar 88, whilst two short arms 92 are mounted on the beam 70 near the places 85 and 86. When the fastening device 60B of the frame 60C is loosened from the tractor 60 and when said frame is turned upside down, the pins 90 and 91 can be hingedly connected to the ends 62 and 61 and the arms 92 can be hingedly connected to the end 63. Said position of the frame 60C is shown in Fig. 7.

The rake wheels 84, 84A, 84B, 84C have the same construction as the rake wheels according to Figs. 1–3. In the working position according to Fig. 4, two of the axles 82, 82A, 82B, 82C on which the rake wheels 84, 84B are mounted are provided at their extremity with a supporting device 92A, 92B comprising a shoe 93, 93A the construction and fastening of said supporting devices 92A, 92B is the same as those according to Figs. 1 and 2. In the working position according to Fig. 6 the supporting member having the shoe 93 is removed to the hindmost axle 83 along with the rake wheel 84. In the working position according to Fig. 7 the rake wheels 84–84C occupy almost the same position with regard to the frame 60C as in the working position according to Fig. 6; the supporting members 92A, 92B comprising the shoes 93, 93A are turned, however, 180° about their axle 82, 82B with respect to the frame 60C, so that their shoes 93, 93A can rest upon the ground.

In the working positions according to Figs. 4 and 5 the implement constitutes a side delivery rake, in the working position according to Fig. 6 it constitutes a swath turner and in the working position according to Fig. 7 the implement constitutes a teddering device. The comparing of Figure 4 with Figure 7 shows that by adjusting the hinged connection 78 it is possible to obtain the most advantageous position of the rake wheels 84, 84A, 84B, 84C. The swath turner according to Figure 6 can be adapted to the distance between the swaths by sliding the bushings 75, 75A as shown by the dotted lines in Figure 6.

According to Figs. 8 and 9 a tractor 100 carries a three-point power lifting device 100A, the three ends of said lifting device being designated by 101, 102 and 103. The pins 104, 104A are hingedly coupled to the ends 101 and 102, said pins constituting the extremities of a beam 105. Two supporting bars 106 and 107 constituting a fastening device extending obliquely upwards are connected to said beam 105 at the hinges 106A and 107A the upper ends of said supporting bars 106 and 107 being hingedly coupled to the end 103 of the middlemost bar. A first frame portion is constituted by the parts 108, 105, 104, 104A, 106A, 107A, 111, 112, 113. A second frame portion will be indicated below.

A horizontal bow 108 is connected to the beam 105, said bow 108 being in part provided with holes 109 for letting a locking pin 110 through an end 111 of a bushing 112 sliding along said part of the bow 108 and being provided at the same time with a hole for the pin 110, can be secured in various positions. The other extremity 113 of the bushing 112 is connected hingeable about a vertical axle to the beam 105. One end of chain 114 is connected to the end of the bar 103 of the middlemost bar, whereas the other end of it is connected by means of a hook 115 to the bow 108. The prolongation of an axle 116 is rotatably supported in the bushing 112. In one or more positions of the axle 116 a pin 117 can be put through a hole in the bushing 112 and through holes in said axle, so that said axle can be secured in one or more desired positions.

The extremity of the axle 116 is connected to the centre of a tube 118 of the frame 118A of the implement, which connection is reinforced by means of struts 119 and 120. Four axles 125, 125A, 125B and 125C parallel to the axle 116 are attached to the tube 118 at 121, 122, 123 and 124, rake wheels 126, 126A, 126B and 126C being freely rotatably mounted on said axles 125, 125A, 125B and 125C. The second frame portion previously mentioned is constituted by the parts 116, 118, 119, 120, 125, 125A, 125B and 125C.

Supporting members provided with shoes 127, 127A and having the same construction as the supporting members according to Figs. 1 and 2 are mounted, moreover, on the axles 125, 125B fixed in the points 122 and 124 and behind the rake wheels 126, 126B mounted on said axles 125, 125B. The rake wheels 126, 126B too have the same construction as the rake wheels in the embodiment of the implement according to the invention, said embodiment being shown in Figs. 1 and 2.

In the construction according to Figs. 8 and 9 the frame 118A can be turned in a very easy way. It is only necessary to lift said frame sufficiently freely from the ground by means of the lifting device 100A of the tractor and after that to cause the axle 116 to rotate in the bushing 112 over an angle of 180°. At the same time the shoes 127, 127A are put into the reversed position in the same way as already was described relative to Figs. 1–3. If the device is dropped, it will stand on the ground in the position shown in Fig. 10.

In connection with the foregoing, it will be noted that beam 105 and bow 108 provide longitudinal spaced bearing portions and thus constitute supporting parts for the bushing 112 which, in turn, carries axle 116.

In the working position according to Fig. 8 or 10, respectively, the implement is a side delivery rake or a teddering device, respectively. It is recommendable not to secure the axle 116 in the bushing 112 in said working positions, but to allow them to be rotatable over a certain angle, owing to which the weight of the frame 118A and the rake wheels 126—126C is favourably spread over the shoes 127, 127A and the lifting device 100A.

According to another embodiment shown in Fig. 11 it is advantageous to apply the tube 118 of Fig. 8 in the position in which the implement works as a side delivery rake at a higher elevation than the axles of the rake wheels, i.e. in the position 118B and to cause the portions 125A to extend obliquely upwards. Owing to this piled material will meet with little trouble from the tube 118B. In the working position in which the implement works as a teddering device the tube 118B is indeed situated lower than the axles of the raking wheels, but upon said treatment the material will not be piled up to a high level.

According to Fig. 12 the supporting members comprising the shoes 127, 127A can be omitted in the implement according to Figs. 8–10 and the weight of the frame can be borne by the lifting device 100A and that is by means of a spring 128 being stretched between the end 103 of the middlemost bar and the hook 115. The chain 114 can be maintained. The spring 128 can be provided with a device for causing a smaller or greater strain in the spring. It will be apparent that the spring 128 could also be attached with its upper end to a neighbouring place on the fastening device 100A, e.g. to a supporting bar 106, or to a place on the tractor.

Fig. 13 shows the implement according to Fig. 12 in a lifted position which can be employed as a transport position, because of the small width of the implement in this position. If the lifting device 100A of the tractor 100 is suitably arranged, the position according to Fig. 13 can easily be obtained by lifting and securing the axle 116 in the right position in the tube 112.

If the lifting device 100A is adjusted in this way, it will be possible to obtain by lifting and after that by taking a curve to the left or to the right and by letting it down again that the implement is transformed from the position in which it is used as a teddering device into the position in which it is used as a side delivery rake without any further inferference. The reversed transformation can be easily carried out in a similar way.

According to Fig. 14 it is possible to replace the spring 128 and the chain 114 by a connecting rod 135 in a device which is substantially carried out as the device shown in Fig. 12, whilst at the same time a spring 136 is applied, the upper extremity of which being attached near the hinge 139A of the upper bar 137 of the lifting device 100A of the tractor and the lower extremity of which being attached to the axle 105. Moreover, a spring 138 is applied to the upper extremity of which is attached to the tractor 100 and the lower extremity of which is attached to a bar 139 of the lifting device. Of course also the other bar of the lifting device 100A, said bar being located at the same height as the bar 139, can be connected to the tractor 100 by means of a spring. In principle it will be sufficient to apply only one kind of the springs mentioned. The effect of the springs is that the weight of the frame and the rake wheels is carried for the greater part by the spring or springs and that the pressure of the rake wheels on the ground can be very light.

According to Fig. 15 the supporting device mounted on an axle such as the axle 125 of a rake wheel 126 behind said rake wheel can carry a running wheel 150 instead of a shoe. The horizontal axle 151 of said running wheel is connected by means of an oblique bar 151A to a bushing 152 which is rotatable about a vertical pin 153. The pin 153 is attached to a bushing 154 which is rotatable about the axle 125, but which bushing 154 can be secured by means of a pin 155 in two positions as is already described for the supporting device of the implement according to Figs. 1-3. Although a self-adjusting running wheel is shown, also a fixedly arranged running wheel can be used.

According to Fig. 16 a rake wheel e.g. 32 can be fixed to the tube 9 of the frame 118A by means of a crank 160, the horizontal axle 161 of which is rotatable in a bearing 162 attached to the tube 9, whilst said rake wheel is rotatably mounted on the crank pin 163. An arm 164 is mounted the free extremity of which arm being provided with apertures 165 in which extremities two springs 166 and 167 are hooked. The other extremities of said springs are hooked in eyes 168 and 169 being fixedly connected at different sides of the bearing 162, so that the springs 166 and 167 counteract one another. A consequence is that the rake wheel 32 upon upward as well as downward deviation is led back to a definite position. This construction has the advantage that it can be used unchanged in a working position in which the frame 118A is turned upside down.

In the claims, the parts 105 and 108 comprise longitudinal spaced bearing portions, and the draft means having two parts, one of said parts being selectively rotatable relative to the other part are illustrated by 112 and 116 and the elements associated therewith. The rake beam is illustrated by part 118, having the rake wheels 126 thereon, and the said rake beam is operatively connected to the second part of the draft means 116. The structure illustrated in Figures 8, 9 and 10 represents a single embodiment of the invention, this embodiment being for illustrative purposes only and is not intended to be construed in a limiting sense. For instance, the parts 112 and 116 may be rotatably and adjustably connected to each other in any suitable manner rather than the sleeved construction shown. A means for rotatably adjustably connecting these parts is contemplated by the structure claimed. Various other modifications may be made within the terms of the claims that would occur to one skilled in this art.

What we claim is:

1. A convertible side delivery rake for laterally displacing material such as hay or other crops lying on the ground, comprising a tractor lift mechanism having longitudinally spaced bearing portions, draft means having two parts, one of said parts being selectively rotatable relative to the other part, the first part of said draft means having longitudinally spaced parts having bearing engagement with said bearing portions, a rake beam having rake wheels thereon operatively connected to a second part of said draft means, whereby when said tractor lift mechanism is actuated said rake beam will be lifted and may be rotated to invert the same to form a tedder.

2. A convertible side delivery rake according to claim 1 wherein said rake beam is rigidly connected to said second part of said draft means.

3. A convertible side delivery rake according to claim 1 wherein the centers of the rake wheels mounted on said rake beam are substantially the same level as said rake beam.

4. A convertible side delivery rake according to claim 1 having one or more ground engaging supporting members interconnected in a selective manner to said rake beam.

5. A convertible side delivery rake according to claim 1 wherein the bearing engagement of said first part of said draft means with said bearing portions is adjustable.

6. A convertible side delivery rake for laterally displacing hay or other material lying on the ground comprising a tractor lift mechanism having a pair of longitudinally spaced bearing portions, draft means having two parts, the first of said parts being adapted to receive the second of said parts, the second of said parts being selectively rotatable relative to the first of said parts, the first of said parts having longitudinally spaced parts having bearing engagement with said bearing portions, a rake beam rigidly connected to the rear portion of said second part of said draft means, an echelon of overlapping rake wheels mounted on said rake beam, whereby when said tractor lift mechanism is actuated said rake beam will be lifted and may be rotated to invert the same to form a tedder.

7. In combination with a tractor having a three-point lift mechanism and a pair of longitudinally spaced rake supporting parts supportably interconnected to said mechanism, a convertible side delivery rake for laterally displacing hay or other material lying on the ground comprising draft means having two parts, the first of such parts being adapted to receive the second of said parts, the second of said parts being selectively rotatable relative to the first part, the first of said parts having longitudinally spaced portions in supported engagement with said rake supporting parts, a rake beam connected to said second part, a row of parallel overlapping rake wheels mounted on said rake beam, whereby when said lift mechanism is actuated said rake beam is lifted and may be rotated to invert same to form a tedder.

References Cited in the file of this patent

UNITED STATES PATENTS

| | | |
|---|---|---|
| 2,447,354 | Morrill | Aug. 17, 1948 |
| 2,472,260 | Morrill | June 7, 1949 |
| 2,621,465 | Klemm | Dec. 16, 1952 |
| 2,621,466 | Kopp | Dec. 16, 1952 |
| 2,637,966 | Richey | May 12, 1953 |
| 2,658,324 | Johnson | Nov. 10, 1953 |
| 2,673,437 | Pollock et al. | Mar. 30, 1954 |
| 2,680,343 | Enos | June 8, 1954 |
| 2,689,446 | Sorrels | Sept. 21, 1954 |